United States Patent [19]
Hoffmann et al.

[11] Patent Number: 5,297,790
[45] Date of Patent: Mar. 29, 1994

[54] DRIVER FOR FEEDING THIN METAL SHEETS ON A CAN WELDING MACHINE

[75] Inventors: Hans-Wilhelm Hoffmann, Widen; Niklaus Portmann, Bellikon, both of Switzerland

[73] Assignee: Elpatronic AG, Zug, Switzerland

[21] Appl. No.: 909,970

[22] Filed: Jul. 7, 1992

[30] Foreign Application Priority Data

Jul. 19, 1991 [CH] Switzerland ............ 02159/91-6

[51] Int. Cl.$^5$ .............................................. B65H 5/16
[52] U.S. Cl. .................................. 271/271; 198/719; 198/731
[58] Field of Search ............... 271/271, 84; 198/719, 198/731, 733, 734

[56] References Cited

U.S. PATENT DOCUMENTS

| | | | |
|---|---|---|---|
| 2,623,746 | 12/1952 | Gegenheimer et al. | 271/271 |
| 2,627,338 | 2/1953 | Vodoz | 198/733 X |
| 2,667,263 | 1/1954 | Bigler et al. | 198/733 |
| 3,233,557 | 2/1966 | Rickel | 198/733 X |
| 3,512,337 | 5/1967 | Fitch | 198/733 X |

Primary Examiner—H. Grant Skaggs
Assistant Examiner—Carol Lynn Druzbick
Attorney, Agent, or Firm—McCormick, Paulding & Huber

[57] ABSTRACT

The driver (12) comprises a carrier (14) for attachment to a conveyor, for example an endless chain. A pusher (16) made of hard-wearing material is attached to the carrier (14) in such a way that when the support moves forwards the pusher engages a rear edge of a sheet (10) to be fed. The pusher (16) is supported through at least one elastic spacer (18) on the carrier (14), in a rearwardly resilient manner. In a preferred embodiment of the driver (12), the pusher (16) comprises a flexible metal sleeve (30) which near each of its two ends rests, by way of a respective spacer (18) in the form of an electrically insulating washer, on a shaft (20) attached to the carrier (16). This makes high rates of acceleration possible when feeding thin metal sheets on a can welding machine, without the sheets being damaged by the driver (12).

7 Claims, 3 Drawing Sheets

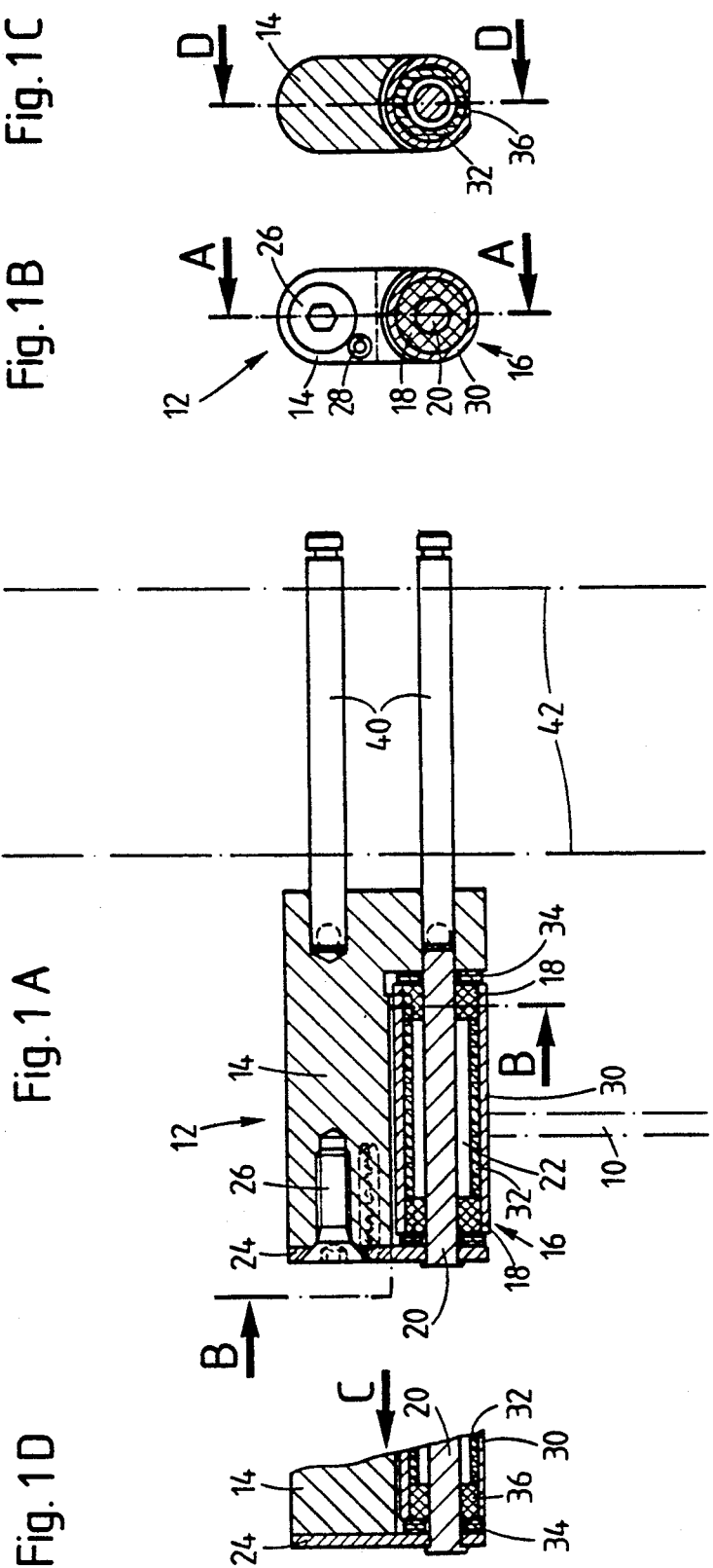

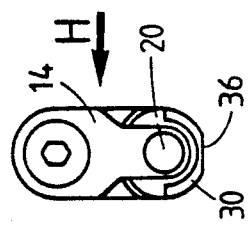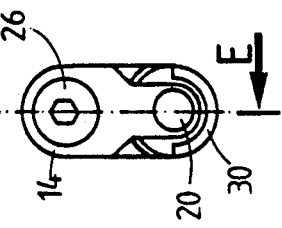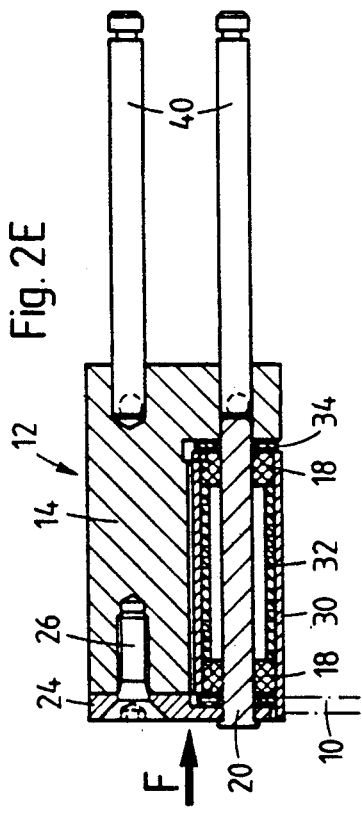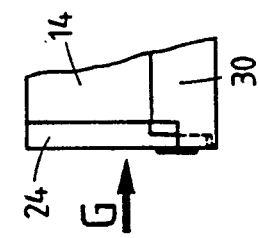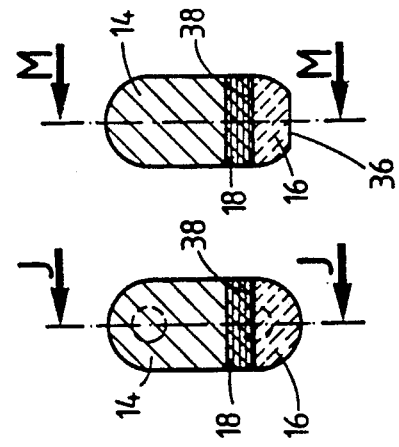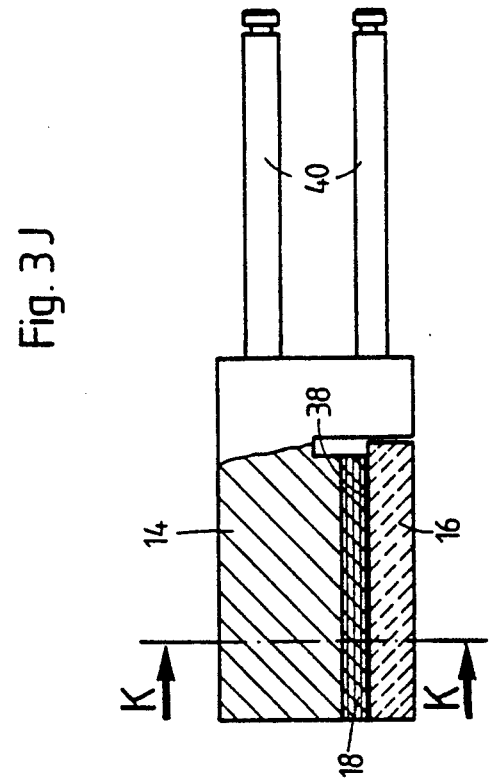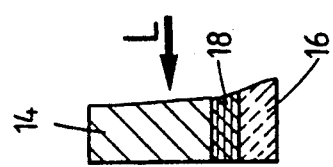

_(5,297,790)_

DRIVER FOR FEEDING THIN METAL SHEETS ON A CAN WELDING MACHINE

BACKGROUND OF THE INVENTION

The invention relates to a driver for feeding thin metal sheets on a can welding machine, having
a carrier for attachment to a conveyor, and
a pusher made of hard-wearing material and attached to the carrier in such a way that when the latter moves forwards it engages a rear edge of a metal sheet to be fed.

Drivers of this type are for example attached to continuously or intermittently circulating conveyor chains as described in U.S. Pat. Nos. 4,824,007 and 4,870,241 owned by the assignee of the present invention. For this purpose the drivers may be constructed so as to each replace all or part of a link of chain. On conventional drivers of this type, the carrier is made of steel and has in its front surface a depression shaped like part of a cylinder, to which a cylindrical pusher made of ceramic material is cemented.

Such drivers are used on can welding machines chiefly to push cylindrical can bodies rounded from a corresponding rectangular sheet blank in a rounding apparatus along a welding arm into a welding station, where they pass between electrode rollers to produce a longitudinal seam. In this manner it is possible to round and weld 300 to 600 or even more bodies per minute from metal sheet of, say, 0.2 mm thickness.

Two or more drivers take up each of the can bodies at the exit from the rounding apparatus and in a short time accelerate them to the welding speed, which for a given number of bodies per unit of time is greater the longer are the bodies. Particularly in the case of long can bodies made of thin metal sheet, the forces necessary for acceleration may become so great that the drivers produce indentations on the rear edges of the bodies. While such indentations do not affect the welding of longitudinal seams on the bodies, they can be a nuisance subsequently when the lid and base are flanged onto each can body.

To prevent such indentations it has hitherto been necessary to either limit the number of can bodies fed per unit of time and hence underutilize the welding station or to provide a comparatively long conveyor line in order to accelerate the bodies gradually.

SUMMARY OF THE INVENTION

It is the object of the invention to make high rates of acceleration possible when feeding thin metal sheets on a can body welding machine.

Based on a driver of the type described above, the object is achieved in accordance with the invention in that the pusher is supported through at least one elastic spacer on the carrier, in a rearwardly resilient manner.

This means that when the pusher strikes a waiting metal sheet, it temporarily lags behind relative to the carrier, storing internal energy through the resilience in the spacer which is then transmitted to the sheet and used to accelerate it. This reduces the maximum force operating on the metal sheet and correspondingly prolongs the duration of the force.

It is advantageous if the pusher comprises a flexible metal sleeve. Such a sleeve has the advantage that when it impinges on a metal sheet to be fed it too is internally deformed, in other words itself stores internal energy through resilience, thereby further mitigating the effect of the force on the metal sheet. The effect of deforming the pusher is principally to flatten its flexible sleeve, thereby increasing the area over which it is in contact with the waiting metal sheet and thus reducing the pressure on the area. This too helps to avoid indentations in the metal sheet.

It is also helpful if near each of its two ends the sleeve rests, by way of a respective spacer in the form of an electrically insulating washer, on a shaft attached to the carrier. This provides the additional advantage of allowing the sleeve to bend like a bar on two supports and hence store additional internal energy through resilience. The electrically insulating property of the spacers prevents stray currents induced by the welding current from being able to flow between the drivers and associated conveyors.

In another embodiment of the invention, the pusher is a bar with a back surface, and a plate of roughly the same length and width as the back surface is provided as the spacer and is joined to said back surface and to the carrier. The joint may for example be produced by vulcanising or gluing.

The pusher may be made of ceramic material, as in the case of the conventional driver initially outlined. Alternatively, however, it is possible to use a pusher made of hard metal or other hard-wearing material. It is safe for the pusher as such to be an electrical conductor, for the elastic spacer can in any case be made from a material that is not an electrical conductor.

Finally, the invention may be further developed so that the pusher has a flattened front face and is supported in a torsionally resilient manner on the spacer. This feature has the advantage that the force exerted by the pusher on the waiting sheet is distributed over a larger area; the torsionally elastic support of the pusher ensures that excessive pressures on the edges due to the pusher being accidentally set at an angle are avoided.

BRIEF DESCRIPTION OF THE DRAWINGS

Examples of embodiments of the invention will now be described with reference to schematic drawings giving further details, wherein:

FIG. 1A shows a first embodiment of a driver in a cross-section on line A—A in Fig. 1B;

FIG. 1B shows the cross-section on line B—B in FIG. 1A;

FIG. 1C shows a variant on the same cross-section as FIG. 1B;

FIG. 1D shows a partial cross-section on line D—D in FIG. 1C;

FIGS. 2E to 2H show a second embodiment of a driver in views corresponding to those of FIGS. 1A to 1D;

FIGS. 3J to 3M show a third embodiment of a driver, in likewise corresponding views.

DESCRIPTION OF THE PREFERRED EMBODIMENTS

Figure 4:
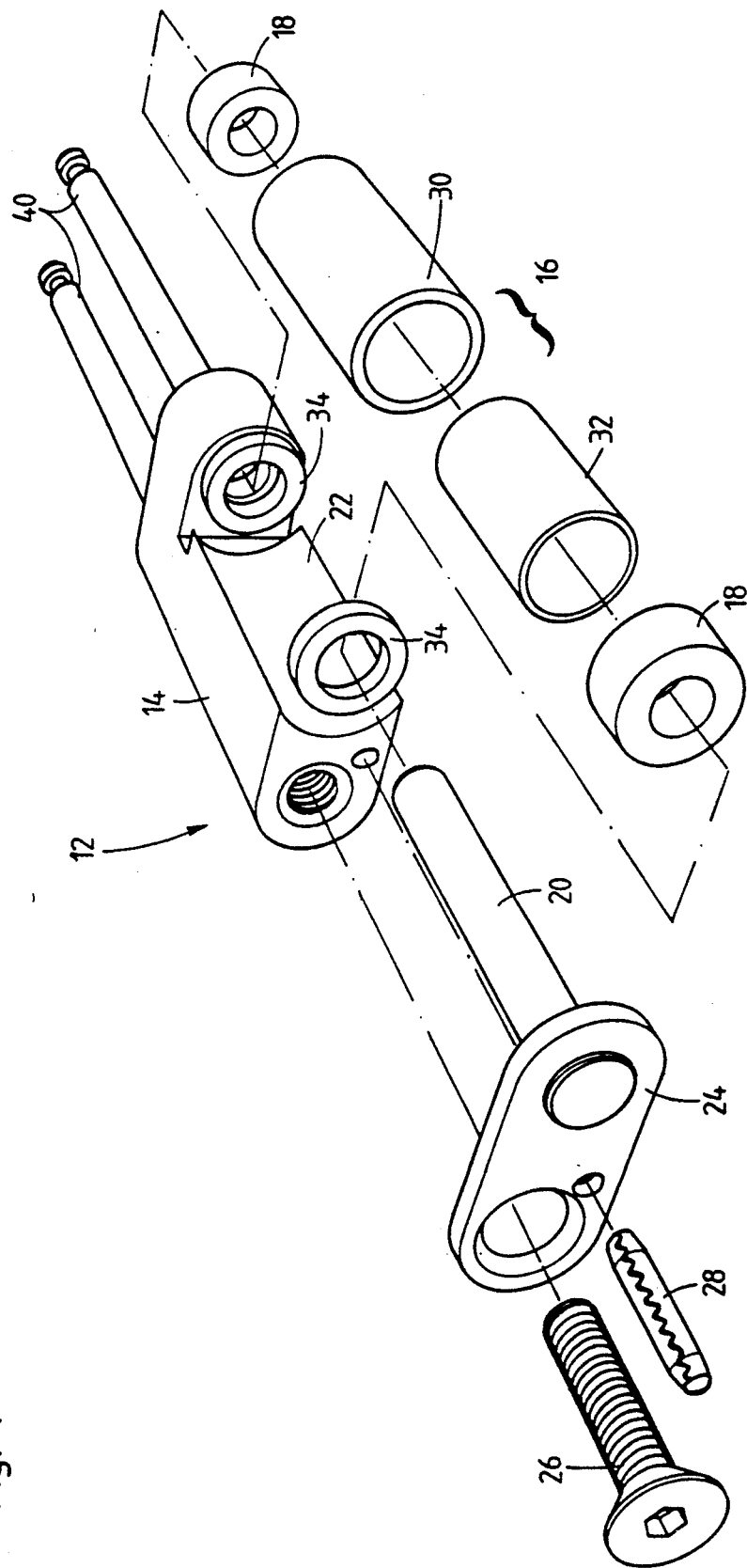
FIG. 4 shows an exploded perspective view of the driver of FIGS. 1A and 1B.

As seen in FIGS. 1A and 1B, a driver 12 is provided to feed a thin metal sheet 10 in the form of a flat sheet blank or rounded can body in a can welding machine such as disclosed in U.S. Pat. Nos. 4,824,007 and 4,870,241 referenced above, the chief components of said driver being a carrier 14, a pusher 16 and a pair of elastic spacers 18.

The carrier 14 incorporates a shaft 20 disposed at right angles to the metal sheet 10 and extending through a frontal recess 22. This recess begins on one side of the carrier 14, on the left in FIG. 1A, and extends almost to the opposite side of the carrier 14. A cover plate 24 is fastened to the left-hand side of the carrier 14 by a screw 26 and secured against rotation by a dowel pin 28. The left-hand end of the shaft 20, as seen in FIG. 1A, is fixed in the cover plate 24, and the opposite end in the carrier 14.

The two spacers 18 hold a thin sleeve 30 of hard, resilient steel centered on the shaft 20. The sleeve 30 forms the pusher 16 together with a spacing bush 32 which it surrounds. The two spacers 18 are each in the form of an annular disc, or washer, and are arranged in respective end portions of the sleeve 30 at a distance from one another determined by the bush 32. A packing ring 34 is arranged axially outside each of the two spacers 18, said ring preventing the sleeve 30 from coming into direct contact with the support 14 and cover plate 24.

The carrier 14 and cover plate 24 are made of normal engineering steel. The sleeve 30 is made from resilient hardened steel. The two spacers 18 are made of rubber or flexible, electrically insulating plastic. The spacing bush 32 and the two packing rings 34 are likewise made of plastic, for example polyamide, and it is important for the two packing rings 34 to be electrically insulators also.

As seen in FIGS. 1A and 1B, both the inside and outside of the sleeve 30 are completely cylindrical. In FIGS. 1C and 1D, however, the sleeve 30 presents a flattened front face 36, parallel to the shaft 20 and which it uses to engage the waiting sheet 10. In both the embodiment in FIGS. 1A and 1B and the variant thereof depicted in FIGS. 1C and 1D the sleeve 30 terminates inside the recess 22 bounded by the cover plate 24.

By contrast, in the example of the embodiment depicted in FIGS. 2E and 2F a dish-shaped extension of the sleeve 30 extends axially over the cover plate 24 and is radially spaced therefrom; for this purpose the cover plate 24 is rounded off at a reduced radius about the shaft 20. The extended sleeve 30 shown in FIGS. 2E and 2F has the advantage that, as indicated in FIG. 2E, it can also engage a waiting sheet 10 in its peripheral region, where it overlies the cover plate 24. In other words, this arrangement prevents the cover plate 24 itself from hitting a waiting sheet 10. This also applies to the variant depicted in FIGS. 2G and 2H, in which the sleeve 30 again has a flat front face 36. Extending the sleeve 30 over the cover plate 24 has the additional advantage that it ensures that it is fitted with the front face 36 actually at the front and unable to twist round even during operation.

In the case of the embodiment depicted in FIGS. 3J and 3K, the pusher 16 is a semi-cylindrical bar made of ceramic material with a plane back surface 38 which extends at right angles to the waiting sheet 10. The spacer 18 is a rubber pad of the same length and width as the back surface 38, which is vulcanised onto said back surface and onto a parallel surface of the carrier 14.

In the variant depicted in FIGS. 3L and 3M, the pusher 16 again has a flat front face 36; the latter extends parallel to the back surface 38 and is somewhat smaller in width than the latter.

In all the examples of embodiments depicted, the or each spacer 18 supports the pusher 16 not only rearwards, ie. towards the carrier 14, but also in torsionally resilient manner, ie. the pusher is able to turn in a limited angular range about a geometric axis that corresponds to the shaft 20.

Likewise in all the examples of embodiments depicted, a pair of pins 40 is attached to the carrier 14 and can be pushed through pairs of link plates 42 on a flat link articulated chain, or roller chain (only outlined in FIG. 1A), thereby forming a chain link along with the driver 12.

We claim:

1. Driver for feeding thin metal sheets on a can welding machine, having a carrier for attachment to a conveyor, and a pusher made of hard-wearing material and attached to the carrier in such a way that when the latter moves forwardly it engages a rear edge of a metal sheet to be fed, characterized in that the pusher is supported on the carrier in a rearwardly resilient manner by at least one spacer holding the pusher in spaced relationship from the carrier and formed by an elastic material.

2. Driver according to claim 1, characterized in that the pusher comprises a resilient sleeve made of metal.

3. Driver according to claim 2, characterized in that near each of its two ends the sleeve rests, by way of a respective spacer in the form of an electrically insulating washer, on a shaft attached to the carrier.

4. Driver according to claim 1, characterized in that the pusher comprises a bar with a back surface, and a plate of approximately the same length and width as the back surface is provided as the spacer and is joined to said back surface and to the carrier.

5. Driver according to claim 4, characterized in that the pusher is made of ceramic material.

6. Driver according to claim 4, characterized in that the pusher is made of hard metal.

7. Driver according to claim 1, characterized in that the pusher has a flattened front face and rests on the spacer in a manner torsionally resilient about an axis extending generally perpendicular to the thin metal sheets.

* * * * *